United States Patent [19]

Daigle et al.

[11] Patent Number: 4,547,096
[45] Date of Patent: Oct. 15, 1985

[54] ALIGNMENT OF TUBULAR PILES FOR JOINDER

[75] Inventors: Verlon C. Daigle, Gray; Wayne R. Smith, Thibodaux, both of La.

[73] Assignee: McDermott International, Inc., New Orleans, La.

[21] Appl. No.: 519,457

[22] Filed: Aug. 1, 1983

[51] Int. Cl.$^4$ ............................ E02D 5/08; E02D 5/16
[52] U.S. Cl. ............................... 405/251; 29/272; 29/464; 228/49.3; 285/27; 285/286
[58] Field of Search ................. 29/464, 272; 228/49 B; 285/286, 31, 27, 24, 22; 405/251, 252

[56] References Cited

U.S. PATENT DOCUMENTS

| | | | |
|---|---|---|---|
| 649,473 | 5/1900 | Palmer | 285/286 X |
| 1,025,759 | 5/1912 | McCluskey | 285/27 |
| 1,127,081 | 2/1915 | Noble | 405/251 |
| 1,188,485 | 6/1916 | Pruyn | 285/27 |
| 1,910,138 | 5/1933 | Hooydonk | 29/272 X |
| 1,980,530 | 11/1934 | Hutchinson | 285/286 X |
| 1,980,561 | 11/1934 | Wagner | 285/22 |
| 1,987,341 | 1/1935 | Kachel | 285/22 X |
| 2,353,561 | 7/1944 | Hassett | 405/251 X |
| 2,646,995 | 7/1953 | Thompson | 285/286 |
| 2,731,933 | 1/1956 | Phillips | 285/22 X |
| 2,934,360 | 4/1960 | Castellanos | 405/251 X |
| 3,092,058 | 6/1963 | Feeler | 29/272 X |
| 3,748,863 | 7/1973 | Pogonowski et al. | 405/251 X |
| 3,796,057 | 3/1974 | Dougherty | 405/251 |
| 3,881,756 | 5/1975 | Takatori et al. | 285/22 |
| 3,899,891 | 8/1975 | Kelly et al. | 405/251 |

FOREIGN PATENT DOCUMENTS 705891  3/1954  United Kingdom ................. 405/251

*Primary Examiner*—Charlie T. Moon
*Attorney, Agent, or Firm*—Robert J. Edwards; D. Neil LaHaye; James C. Simmons

[57] ABSTRACT

An aligner and method of alignment of two tubular piles for joinder. The aligner extends from one end of one tubular pile for insertion in the other tubular pile. One or more shim members are disposed between and in engagement with the outer surface of the aligner extended portion and the inner surface of the other tubular pile when the extended portion is inserted therein for maintaining the two piles in alignment for joinder.

11 Claims, 5 Drawing Figures

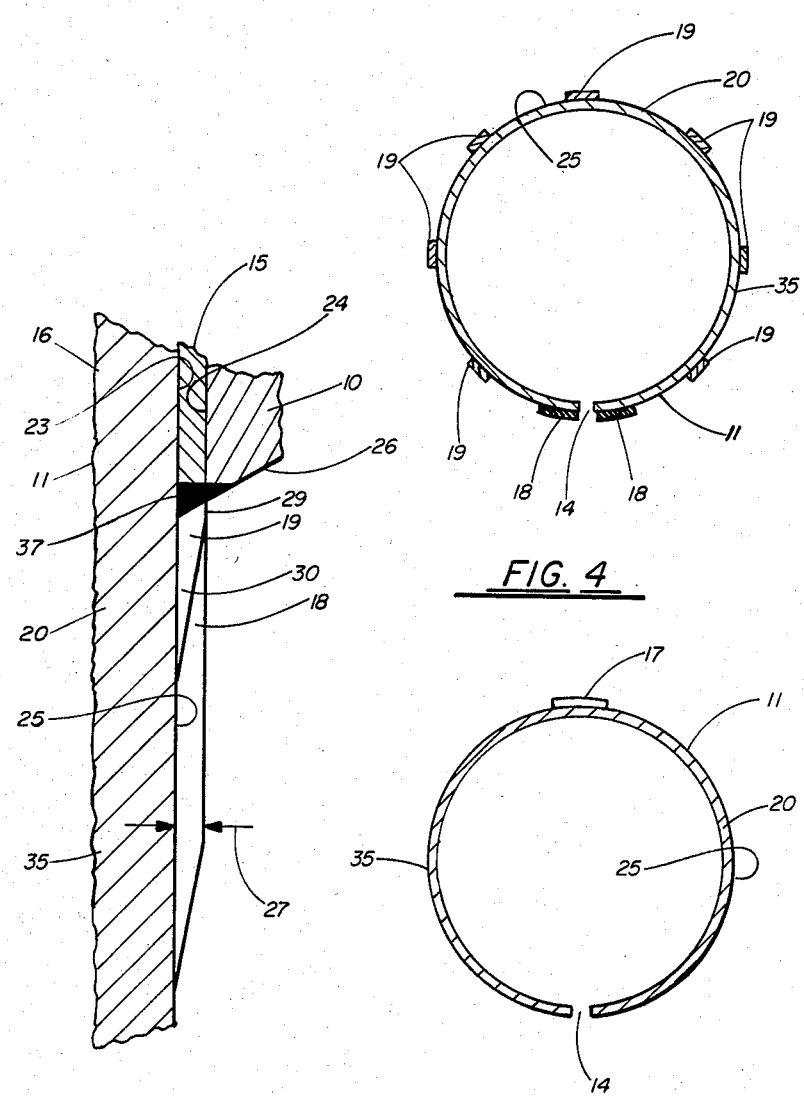

ALIGNMENT OF TUBULAR PILES FOR JOINDER

This invention relates in general to alignment of tubular piles for joinder.

More specifically, the invention relates to an aligner for lining up an upper pile and a lower pile for welding or otherwise joining. An aligner of two such piles is typically called a stabbing point in the art and may be described as a reduced diameter portion of a pile that is inserted into the upper end of a lower pile after which the two piles may be welded or otherwise joined together. In practice, it is important that the two piles be accurately aligned and not skewed one to the other.

Prior art connectors of the stabbing point type include those of two basic types. One type of stabbing point connector is that which is fabricated from steel plate rolled to substantially the exact size of the inside diameter of the pile into which it is to be stabbed. The use of this type of connector is undesirably time consuming since the upper pile has to be worked from side to side until the stabbing point slides into position because of the extreme amount of friction created by the close tolerance of the stabbing point as it enters the lower pile. Another type utilizes a steel plate rolled to a smaller outside diameter than the inside diameter of the pile into which it is to be stabbed. When this type of connector is used, substantial and time consuming effort is required to bring the upper pile into proper alignment using such equipment as derricks, turnbuckles, and hydraulic jacks afterwhich brackets are conventionally welded to the piles in preparation for welding them together.

It is accordingly an object of the present invention to provide a stabbing point which is easily insertable into a lower pile and which also provides effective and easy alignment of the piles for welding.

It is another object of the present invention to provide such a stabbing point which is inexpensive, easy to manufacture, rugged in construction, and easy to use.

It is yet another object of the present invention to provide a method of aligning tubular piles wherein the stabbing point of one pile is easily insertable into the end of the other pile and the piles are easily and quickly aligned without the use of turnbuckles, hydraulic jacks, and the like and without the welding of brackets thereto to maintain alignment in preparation for welding.

The various features of novelty which characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

IN THE DRAWINGS:

FIG. 3 is an enlarged view taken along lines 3—3 of FIG. 1;

FIG. 4 is a slightly enlarged view taken along lines 4—4 of FIG. 1; and

FIG. 5 is a slightly enlarged view taken along lines 5—5 of FIG. 1.

Figure 1:
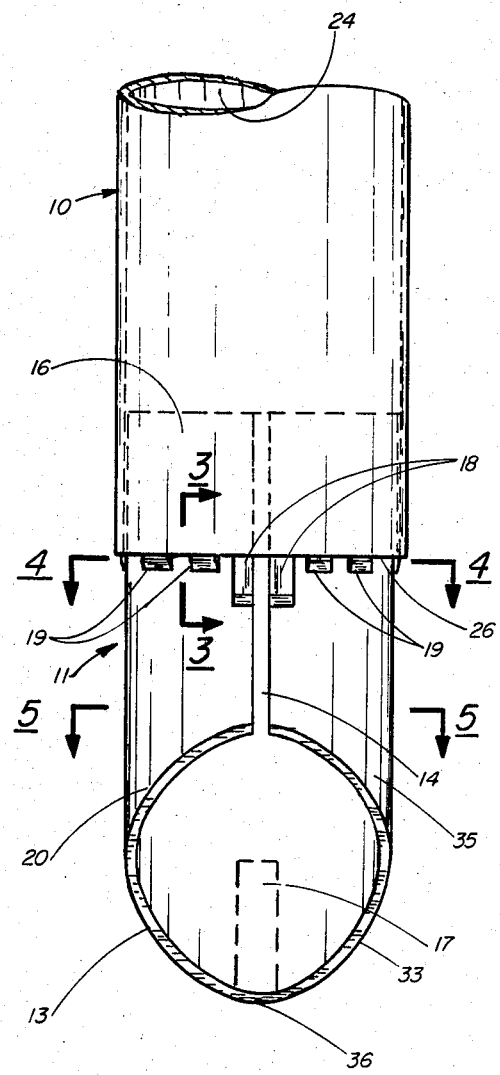
FIG. 1 is a perspective view of an upper tubular pile equipped with a stabbing point embodying the present invention.
Figure 2:
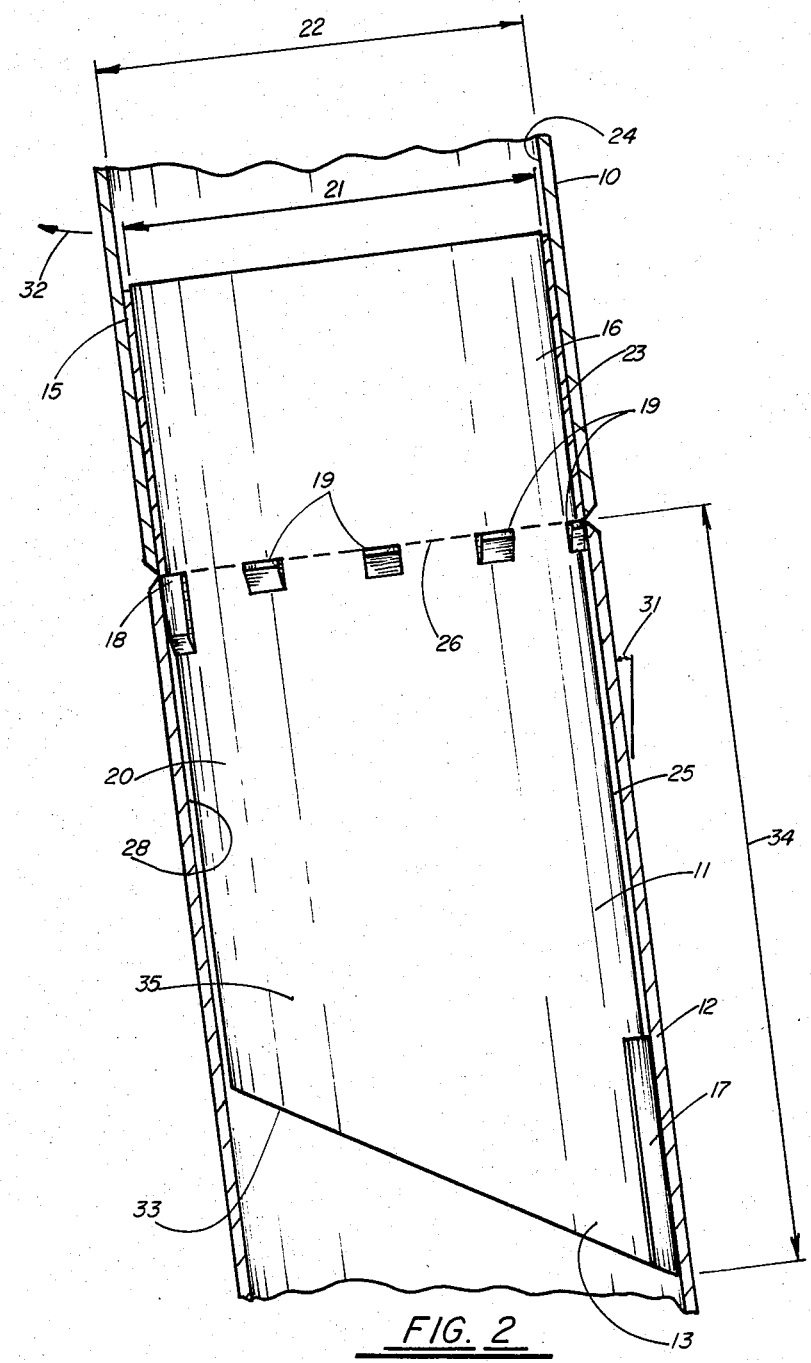
FIG. 2 is an enlarged side elevation view, partly in section, of the upper tubular pile and stabbing point of FIG. 1, as seen with the stabbing point inserted into an underlying tubular pile to effect connection thereto.

In FIG. 1 there is shown a first tubular pile such as upper pile 10 to which is attached an aligner 11 (also referred to herein as a stabbing point) for effecting alignment of the pile 10 to a second tubular pile such as underlying pile 12, as shown in FIG. 2. The stabbing point 11 and piles 10 and 12 may typically be made of steel and have diameters in the order of 2 to 5 feet or more.

Stabbing point 11 may be composed of a generally cylindrical member 35 such as, for example, rolled steel, as shown in the drawings, or a seamed or seamless pipe that is inserted into the upper pile 10 and is rigidly connected thereto for extension generally coaxially from the lower end 26 thereof, the extended portion, illustrated at 20, being disposed for insertion into the upper end portion of the underlying tubular pile 12.

To facilitate insertion into the lower pile 12, the stabbing point 11 preferably has a forwardly extending tapered end portion 13. If the cylindrical member 35 is a rolled steel member, it may be expediently provided, as shown in FIG. 1, with a longitudinally extending slit 14 preferably tack welded at one or both ends to provide ease of fabrication. The slit 14 is preferably located generally diametrically opposite to the point 36 of the tapered end portion 13 so that the tapered end portion may have greater strength and rigidity for preventing the upper pile from becoming skewed relative to the lower pile as will be hereinafter more fully described.

The stabbing point 11 is provided with an outer diameter, illustrated at 21, which is suitably less than the inner diameter, illustrated at 22, of pile 10 in order to provide ease and quickness of insertion of the stabbing point into the lower pile 12 since the upper and lower piles 10 and 12 respectively normally have the same inner diameters. The resulting annular clearance (i.e., one-half of the difference between diameter 22 and diameter 21) may be taken up by shim 15 of suitable thickness inserted between the outer surface 23 of the unextended upper end portion 16 of stabbing point 11 and the inner surface 24 of the upper pile 10. The upper end portion 16, shim 15, and the inner surface of upper pile 10 may be welded or otherwise suitably connected together such as by weld shown at 37 in FIG. 3 and by weld (not shown) at the upper stabbing point end. Alternately, the stabbing point 11 may be provided with a diameter at its upper end which is equal to the upper pile inner diameter 22, then welded to the upper pile inner surface 24 at the upper end, and be provided with a slight taper from its upper end so that the extended portion 20 has an outer diameter equal generally to diameter 21. There may be various other means of attachment of the stabbing point 11 to the upper pile 10 and each such means is meant to come within the scope of the claims of the present invention.

In order to effectively and easily maintain the upper pile 10 in alignment with the lower pile 12 for welding, in accordance with the present invention, at least one and preferably a plurality of shim members are disposed between and in engagement with the outer surface 25 of extended portion 20 and the inner surface 28 of lower pile 12 when the extended portion 20 is inserted in the lower pile 12 to maintain the upper pile 10 in alignment with the lower pile 12 for welding. Although the scope of this invention and the claims is meant to include the attachment of one or more shim members to the lower pile inner surface 28, it is preferred that they be connected to the outer surface 25 of the extended portion 20 of the stabbing point 11. Each shim member is provided with a thickness illustrated at 27 generally equal to one-half of the difference between the lower pile inner diameter and the stabbing point outer diameter at the respective position on the stabbing point 11 to provide suitable spacing between the stabbing point outer surface 25 and the inner surface 28 of the lower pile 12 for alignment of the upper pile 10 with the lower pile 12. However, it should be understood that if either the stabbing point or lower pile is out-of-round, the thickness 27 should be adjusted accordingly, in accordance with principles of common knowledge to those of ordinary skill in the art to which this invention pertains, to compensate for the amount of out-of-roundness.

To maintain the upper pile 10 in concentric relation with the lower pile 12 at the region of their juncture, there is provided one or more first shims 19 welded or otherwise attached to the stabbing point outer surface 23 adjacent the end 26 of upper pile 10; that is, they are located within a distance from the upper pile end 26 equal to less than about one-eighth of the overall length 34 of the extended portion 20 of the stabbing point. However, first shims 19 each terminate preferably at the upper pile end. These shims 19 are preferably wedge-shaped; that is, each of them has an upper portion 29 nearest pile end 26 having thickness 27 for engaging the inner surface 28 of the lower pile 12 to provide concentric alignment thereof with the upper pile 10, and each of them further has a lower portion 30 which tapers downwardly at a suitable angle such as, for example, 15 to 20 degrees, for ease of bringing the upper portions 29 gradually into engagement with the lower pile inner surface 28 for alignment of the upper and lower piles concentrically. Although the number of first shims 19 may vary, there should be at least one first shim 19 or portion thereof in each quadrant of the stabbing point circumference, and it is believed that a cumulative coverage of 30 degrees or more of the stabbing point circumference by the first shims 19 provides sufficient contact surface. A single first shim 19 covering at least 270 degrees of the stabbing point circumference may alternately be provided. These shims 19 may be conveniently made by depositing weld bead on the stabbing point outer surface 25 in pads near the junction thereof with the upper pile 10, and then grinding the weld bead pads into smooth and tapered wedge-shaped members.

In typical constructions, it is often necessary that the piles be connected together in a somewhat inclined centerline relation such as at the angle with the vertical direction which angle is illustrated at 31 in FIG. 2. Thus, it may be said that the direction of lean of the piles in FIG. 2 is the direction illustrated at 32. In such a case, there is a tendency for the upper pile 10 to become skewed in the direction of lean 32 relative to the lower pile 10. Not only is it desirable that the piles be concentrically aligned but it is also desirable that they be inclined at the same angle (i.e., not be skewed) for welding one to the other.

In order to prevent the upper pile 10 from becoming skewed relative to the lower pile 12 in accordance with an aspect of the present invention there is welded or otherwise attached to the stabbing point outer surface 25 at least one second shim 17 adjacent the stabbing point lower end 33; that is, within a distance in an axial direction from the end 33 which is equal to less than about one-eighth of the overall stabbing point extended portion length 34. This second shim 17 is provided adjacent lower end 33 to face away from the direction of lean 32 when the stabbing point 11 is inserted in the lower pile 12.

There is further welded or otherwise attached to the stabbing point outer surface 25 at least one third shim 18 adjacent the upper pile end 26; that is, it is located within a distance from the upper pile end 26 which is equal to less than about one-eighth of the stabbing point extended portion overall length 34. This third shim 18 is provided adjacent upper pile end 26 to face in the direction of lean 32 when the stabbing point 11 is inserted in the lower pile 12. Thus, the third shim is circumferentially located on the stabbing point outer surface 25 to be diametrically opposite the second shim 17; that is, a portion of a third shim 18 is spaced circumferentially about the stabbing point about 180 degrees from a portion of a second shim 17. The second and third shims each have thickness 27 to bear in the plane of lean against the lower pile inner surface 28 away from and in the direction of lean 32 respectively in heel-to-toe fashion to thereby maintain the desired spacing between the stabbing point 11 and lower pile 12 throughout the stabbing point extended portion length 34 and to thereby prevent skewing of the upper pile 10 relative to the lower pile 12.

Of course, if the stabbing point outer diameter were to vary along its length, then the shim thicknesses 27 should vary accordingly between the first, second, and third shims 19, 17, and 18 respectively since the thickness is equal to one-half of the difference between the lower pile inner diameter and the stabbing point outer diameter at the respective position of the shim on the stabbing point, and the thickness may be further adjusted to compensate for any out-of-roundness of either the stabbing point or lower pile at the respective position of the shim, as previously discussed. It is further preferred that the second shim 17 extend to and terminate at the lowermost stabbing point end 36 and that the third shim 18 extend to and terminate at the upper pile end 26, as shown in FIG. 2, to maximize the leverage applied to maintain the desired angle of lean 31. A third shim 18 also serves as a first shim since it also has thickness 27 and may thus also be considered as a first shim for the purposes of the claims.

The particular sizes of the shims can be determined utilizing principles commonly known to those of ordinary skill in the art to which this invention pertains. For the purposes of illustrating but not limiting the scope of the invention, the following is an example of the preferred embodiment of the invention. For piles the inner diameters of which are 45 in., a stabbing point having an outer diameter of 44.75 in. is considered suitable. Each of the shims thus has a thickness of about 0.125 in. and is attached to the outer surface of the stabbing point. A third shim is positioned on each side of the slit. Each of these third shims extends from the upper pile end a distance axially of about 8 in. and over a distance circumferentially of about 30 degrees. Eight first shims are spaced proportionately with each other and with the pair of third shims circumferentially about the stabbing point. Each of these first shims extends from the upper pile end a distance axially of about 1.5 in. and over a distance circumferentially of about 4 in. One second shim is positioned diametrically opposite to the pair of third shims.. It extends from the stabbing point lowermost end a distance axially of about 18 in. and over a distance circumferentially of about 45 degrees.

In accordance with the method of the present invention, after the upper pile 10 has been assembled with the stabbing point 11 and shims, the stabbing point 11 is inserted into the lower pile 12 and is rotated so that the second shim 17 is facing away from the direction of lean 32 of the piles and the third shim 18 is facing toward the direction of lean. The stabbing point is then further inserted so that the tapered lower portions 30 of the first shims engage the lower pile inner surface 28 and bring the upper portions 29 of the first shims into engagement with the lower pile inner surface 28 for concentrically aligning the piles. Meanwhile, the second and third shims 17 and 18 respectively bear against the lower pile inner surface 28 to align the upper pile 10 to the angle of lean 31 of the lower pile. After positioning of the piles 10 and 12 in proper alignment, they may then be welded or otherwise joined together without the use of turnbuckles, hydraulic jacks, the the like and without first welding brackets thereto.

Certain features of this invention may sometimes be used to advantage without a corresponding use of the other features. For example, one or more first shims may be provided on a stabbing point to maintain the piles in concentric relation without second or third shims being provided, or only a second and a third shim may be provided. While a specific embodiment of the invention has been shown and described in detail to illustrate the application of the principles of the invention, it will be understood that the invention may be embodied otherwise without departing from such principles. For example, the stabbing point may be attached to and extend upwardly from the lower pile for insertion into an upper pile.

What is claimed is:

1. An aligner for aligning a first tubular pile to a second tubular pile, comprising:
   a generally cylindrical member connected to the first tubular pile, having a forwardly extending pointed tapered end portion, and extending generally coaxially from one end thereof, the extended portion of the cylindrical member being disposed for insertion into an end portion of a second tubular pile having an inner diameter greater than the outer diameter of said extended portion;
   at least one first shim member disposed adjacent said one end of the first tubular pile between and in engagement with the outer surface of said cylindrical member extended portion and the inner surface of the second tubular pile, when said cylindrical member extended portion is inserted in the second tubular pile, to maintain the first tubular pile in alignment with the second tubular pile; and a second shim member attached to the outer surface of said cylindrical member at the lowermost end of said forwardly extending tapered end portion thereon.

2. An aligner according to claim 1 wherein said first shim member is connected to the outer surface of said cylindrical member extended portion.

3. An aligner according to claim 2 wherein said first shim member of the aligner comprises a plurality of first shim members.

4. An aligner according to claim 3 wherein said plurality of said first shim members comprises a plurality of said first shim spaced about the circumference of said cylindrical member extended portion such that at least a portion of one of said first shims is disposed in each quadrant of the extended portion circumference.

5. An aligner according to claim 3 wherein said first shim comprises a first portion for engaging the second pile inner surface for maintaining the first pile in concentric relation with the second pile, and a second portion which is tapered from said first portion in a direction away from said one end of the first tubular pile.

6. An aligner according to claim 3 wherein said plurality of said first shim members further comprises at least one third shim disposed adjacent said one end of the first tubular pile and diametrically opposite said second shim.

7. An aligner according to claim 3 wherein said plurality of said first shim members further comprises at least one third shim disposed adjacent said one end of the first tubular pile and diametrically opposite said second shim.

8. An aligner according to claim 1 wherein said first shim member of the aligner comprises a plurality of first shim members.

9. An aligner according to claim 8 wherein said plurality of said first shim members comprises at least one third shim disposed adjacent said one end of the first tubular pile and diametrically opposite said second shim.

10. An aligned pair of tubular piles, comprising:
    a first tubular pile,
    a second tubular pile,
    a generally cylindrical member connected to the first tubular pile and extending generally coaxially from one end thereof, the extended portion having a forwardly extending pointed tapered end portion disposed in and end portion of the second tubular pile, having an inner diameter greater than the outer diameter of said extended portion
    at least one first shim member disposed adjacent the end of the first tubular pile between and in engagement with the outer surface of said cylindrical member and the inner surface of said second tubular pile to maintain said first tubular pile in alignment with said second tubular pile, and
    a second shim member attached to the outer surface of said cylindrical member at the lowermost end of said forwardly extending tapered end portion thereon.

11. A pair of tubular piles according to claim 10 wherein said second tubular pile is disposed to extend upwardly at an angle of lean, and said first shim member further comprises at least one third shim adjacent said one end of said first tubular pile, and said second shim is further disposed to face away from the direction of lean and said third shim is disposed to face toward the direction of lean for aligning said first pile to extend upwardly at said angle of lean.

* * * * *